Patented Aug. 11, 1936

2,050,595

UNITED STATES PATENT OFFICE 2,050,595

METHOD OF PREPARING RUBBER-LIKE COMPOSITIONS

Jacob Emerson Wolfe, Akron, Ohio, assignor to The B. F. Goodrich Company, New York, N. Y., a corporation of New York No Drawing. Application January 20, 1932, Serial No. 587,762

4 Claims. (Cl. 106—22)

This invention relates to the art of preparing synthetic rubber-like compositions and particularly to such compositions containing polymerized vinyl halides.

An object of this invention is to prepare a synthetic rubber-like composition of high tensile strength and elongation. Another object is to prepare such a composition which is resistant to the action of solvents and of high temperatures. Other objects will be manifest from the following description of the invention.

It is well known that vinyl chloride may be polymerized by exposure to actinic rays or by heating in the presence of certain catalysts such as peroxides, forming amorphous masses which are highly colloidal in nature. According to the degree of polymerization, the products may be soluble at ordinary temperatures in certain solvents such as acetone or chlorbenzene, or may be insoluble at ordinary temperatures, but soluble in many solvents at elevated temperatures.

If the vinyl chloride of the latter degree of polymerization, namely, polymerized to the point at which it is soluble only at elevated temperatures, is dissolved in appropriate proportions of a non-volatile solvent therefor, and the solution cooled to room temperatures, it sets to a firm, but highly resilient gel, exhibiting many of the most characteristic properties of ordinary soft rubber. Such rubber-like compositions, however, cannot be employed at high temperatures, for the gel readily reliquefies when it is heated, especially in the presence of further proportions of solvents.

In accordance with this invention, a vinyl halide is polymerized by any convenient method to a point at which the product is still soluble at elevated temperatures. The product is then dissolved in a heated non-volatile solvent (plasticizer), with or without the aid of a more volatile solvent, brought to the desired shape, and set by cooling. The shaped product is then exposed to actinic radiation to increase the final strength and raise the softening temperature of the product and decrease its solubility.

For example, a concentrated methanol solution of vinyl chloride may be exposed to the sun or to ultra-violet light from a suitable source until a considerable volume of amorphous precipitate has formed. This precipitate is polymerized vinyl chloride and is separated by filtration from the solvent containing unchanged and partially polymerized vinyl chloride. It takes the form of a white or light-colored, amorphous, finely divided powder.

This powdered polymerized vinyl chloride is dissolved in a plasticizer such as o-nitro diphenylether. For example, 100 parts by weight of the powdered polymer is mixed with 75 parts of o-nitro diphenylether on a hot roll mill, and is then molded in a metallic mold heated to about 165° C. At this temperature the solution is completed and the mass becomes thoroughly homogeneous in a short time. After 20 minutes the mold is cooled and the article removed.

The molded resilient article is then exposed to actinic radiations such as the light of a mercury vapor arc. The tensile strength of the composition gradually increases upon exposure, and the product becomes increasingly resistant to the action of solvents and high temperatures, until ultimately a completely irreversible elastic gel is formed.

This final product, the resilient polymerized vinyl chloride in a form which cannot be reliquefied by heating to any temperature which will not decompose it, cannot be produced by any process of direct admixture or solution of its two components, namely, the polymerized vinyl chloride and the plasticizer, but is a novel product of the process of this invention.

If a product of greater resilience is desired the proportion of solvent is increased, while less resilient products require less of the solvent or plasticizer. For instance, 100 parts of the powdered polymerized vinyl chloride may be dissolved in 500 parts of boiling chlortoluene containing 25 parts of o-nitro diphenylether, and 100 parts of blanc fixe. The liquid is particularly useful as a coating composition for impregnating paper, fabric, etc. or for coating impervious articles. The chlortoluene, being volatile, readily evaporates leaving a hard, but flexible and resilient coating. Such coatings, being normally comparatively thin, may be treated with a comparatively short exposure to the actinic radiation, with the effect of increasing the strength of the film to as much as ten times the strength before exposure.

Although vinyl chloride is specifically disclosed above, it will be understood that other polymerized vinyl halides such as the bromide may likewise be employed. Many solvents and plasticizers other than those mentioned above may be substituted therefor, either in whole or in part. In general any neutral aromatic compound which is liquid and of the desired volatility may be employed. Nitro compounds and aryl halides are particularly useful, as are esters such as benzyl benzoate, dibutyl phthalate, tricresyl phosphate, etc. Purely aliphatic compounds such as fats or fatty acids, however, appear to be incompatible with the polymerized vinyl halides.

The plasticized polymerized vinyl halides may advantageously be treated by exposure either to an artificial source of actinic radiation or to natural sunlight, the choice depending largely on the thickness of the layer to be treated and the magnitude of the desired effect.

It is to be understood that the process is subject to numerous modifications without exceeding the scope of the invention, and that the invention is accordingly to be limited only as may be required by the prior art and as indicated in the appended claims.

I claim:

1. The method of preparing a resilient composition which comprises dissolving a polymerized vinyl chloride which is insoluble at ordinary temperatures, in a plasticizer at an elevated temperature, shaping the mass, and temporarily exposing it to actinic radiation.

2. The method of preparing a resilient composition which comprises polymerizing vinyl chloride to a point at which it is insoluble at ordinary temperatures but still soluble at elevated temperatures, dissolving it at an elevated temperature in a plasticizer, shaping the mass, and exposing it to an artificial source of actinic radiation.

3. The method of claim 2, in which the mass is exposed to ultra-violet light.

4. The method of preparing a resilient coating which comprises dissolving a polymerized vinyl chloride which is insoluble at ordinary temperatures, in a mixture of a volatile solvent and a plasticizer at an elevated temperature, applying a layer of the liquid to a surface, evaporating the volatile solvent, and exposing the coating to an artificial source of actinic radiation.

JACOB EMERSON WOLFE.